United States Patent
Deguchi et al.

(10) Patent No.: US 12,078,590 B2
(45) Date of Patent: Sep. 3, 2024

(54) CONCENTRATION MEASURING METHOD, AND CONCENTRATION MEASURING DEVICE

(71) Applicants: TOKUSHIMA UNIVERSITY, Tokushima (JP); FUJIKIN INCORPORATED, Osaka (JP)

(72) Inventors: Yoshihiro Deguchi, Tokushima (JP); Masaaki Nagase, Osaka (JP); Kouji Nishino, Osaka (JP); Nobukazu Ikeda, Osaka (JP)

(73) Assignees: TOKUSHIMA UNIVERSITY, Tokushima (JP); FUJIKIN INCORPORATED, Osaka (JP)

( * ) Notice: Subject to any disclaimer, the term of this patent is extended or adjusted under 35 U.S.C. 154(b) by 232 days.

(21) Appl. No.: 17/905,486

(22) PCT Filed: Mar. 4, 2021

(86) PCT No.: PCT/JP2021/008377
§ 371 (c)(1),
(2) Date: Sep. 1, 2022

(87) PCT Pub. No.: WO2021/182279
PCT Pub. Date: Sep. 16, 2021

(65) Prior Publication Data
US 2023/0124208 A1   Apr. 20, 2023

(30) Foreign Application Priority Data
Mar. 13, 2020  (JP) .................. 2020-044828

(51) Int. Cl.
| | |
|---|---|
| *G01N 21/3504* | (2014.01) |
| *G01N 21/27* | (2006.01) |
| *G01N 21/31* | (2006.01) |

(52) U.S. Cl.
CPC ......... *G01N 21/274* (2013.01); *G01N 21/314* (2013.01); *G01N 21/3504* (2013.01)

(58) Field of Classification Search
CPC . G01N 21/274; G01N 21/3504; G01N 21/314
See application file for complete search history.

(56) References Cited

U.S. PATENT DOCUMENTS

| | | |
|---|---|---|
| 2016/0084700 A1 | 3/2016 | Nagase et al. |
| 2018/0217054 A1 | 8/2018 | Deguchi et al. |
| (Continued) | | |

FOREIGN PATENT DOCUMENTS

| | | | | |
|---|---|---|---|---|
| CN | 111208083 A | * | 5/2020 | |
| DE | 102016108267 A1 | * | 11/2017 | ........... G01N 21/314 |
| (Continued) | | | | |

OTHER PUBLICATIONS

International Search Report issued in PCT/JP2021/008377; mailed May 25, 2021.

*Primary Examiner* — Maurice C Smith
(74) *Attorney, Agent, or Firm* — Studebaker & Brackett PC

(57) ABSTRACT

A concentration measurement method performed in a concentration measurement device including an electric unit having a light source and a photodetector, a fluid unit having a measurement cell through which a gas flows, and a processing circuit for calculating a concentration of the gas based on an intensity of a light passing through the measurement cell. The concentration measurement method includes a step of determining an absorption coefficient of the measurement gas using a reference absorption coefficient determined in association with the reference gas and a correction factor associated with the measurement gas, and a step of obtaining a concentration of the measurement gas flowing in the measurement cell using the absorption coefficient of the measurement gas. When the absorption peak (Continued)

wavelength of the measurement gas is longer than the peak wavelength of the light source, a reference gas having a longer absorption peak wavelength than the peak wavelength of the light source is used, and when the absorption peak wavelength of the measurement gas is shorter than the peak wavelength of the light source, a reference gas having a shorter absorption peak wavelength than the peak wavelength of the light source is used.

7 Claims, 7 Drawing Sheets

(56) References Cited

U.S. PATENT DOCUMENTS

| | | |
|---|---|---|
| 2019/0271636 A1 | 9/2019 | Deguchi et al. |
| 2022/0074851 A1 | 3/2022 | Nagase et al. |

FOREIGN PATENT DOCUMENTS

| | | | | |
|---|---|---|---|---|
| JP | 2014-219294 A | 11/2014 | | |
| JP | WO2020158506 A1 * | 12/2021 | ............. | G01N 21/33 |
| KR | 10-2014-0119739 A | 10/2014 | | |
| WO | 2013/109728 A1 | 7/2013 | | |
| WO | 2017/029792 A1 | 2/2017 | | |
| WO | 2018/021311 A1 | 2/2018 | | |
| WO | 2020/158506 A1 | 8/2020 | | |

* cited by examiner (a)

| | | LED PEAK WAVELENGTH (nm) | | |
|---|---|---|---|---|
| | | 297.5 | 300 | 302.5 |
| CELL TEMP (°C) | 100 | $\alpha_{ace,L1,T1}$ | $\alpha_{ace,L2,T1}$ | $\alpha_{ace,L3,T1}$ |
| | 130 | $\alpha_{ace,L1,T2}$ | $\alpha_{ace,L2,T2}$ | $\alpha_{ace,L3,T2}$ |
| | 150 | $\alpha_{ace,L1,T3}$ | $\alpha_{ace,L2,T3}$ | $\alpha_{ace,L3,T3}$ |

(b)

| | | LED PEAK WAVELENGTH (nm) | | |
|---|---|---|---|---|
| | | 297.5 | 300 | 302.5 |
| CELL TEMP (°C) | 100 | $MO_{A,L1,T1}$ | $MO_{A,L2,T1}$ | $MO_{A,L3,T1}$ |
| | 130 | $MO_{A,L1,T2}$ | $MO_{A,L2,T2}$ | $MO_{A,L3,T2}$ |
| | 150 | $MO_{A,L1,T3}$ | $MO_{A,L2,T3}$ | $MO_{A,L3,T3}$ |

(a)

(b)

(a)

(b)

CONCENTRATION MEASURING METHOD, AND CONCENTRATION MEASURING DEVICE

TECHNICAL FIELD

The present invention relates to a concentration measurement method and a concentration measurement device, and more particularly, to a concentration measurement method and a concentration measurement device for measuring a fluid concentration based on an intensity of light transmitted through a measurement cell.

BACKGROUND ART

Conventionally, a concentration measurement device (so-called in-line type concentration measurement device) has been known. It is incorporated in a gas supply line for supplying a raw material gas to semiconductor manufacturing equipment and is configured to measure a concentration of the gas. As the raw material gas, for example, an organometallic (MO) gas obtained from a liquid material or a solid material may be used.

In this type of concentration measurement device, a light from a light source having a predetermined wavelength is made incident on a measurement cell through which a gas flows, and transmitted light passing through the measurement cell is received by a light receiving element, whereby absorbance is measured. Further, from the measured absorbance, the concentration of the measured gas can be determined according to Lambert-Beer's law (for example, Patent literatures 1 to 3).

In this specification, various transmitted light detection structures used to detect the concentration of a fluid are broadly referred to as measurement cells. The measurement cell includes not only a separately provided measurement cell branched from the fluid supply line, but also an in-line type transmitted light detection structure provided in the middle of the fluid supply line as shown in Patent literatures 1 to 3.

PRIOR-ART DOCUMENT

Patent Documents

Patent literature 1: Japanese Laid-Open Patent Publication No. 2014-219294
Patent literature 2: International Publication No. WO2017/029792
Patent literature 3: International Publication No. WO2018/021311

SUMMARY OF INVENTION

Technical Problem

Although the concentration of various gases can be measured using a concentration measurement device, until now, the applicant has obtained an absorption coefficient as a reference (hereinafter, sometimes referred to as a reference absorption coefficient) by using a reference gas or a calibration gas such as acetone gas before shipment. Here, the absorption coefficient is an index indicating the absorption susceptibility of a light entered into a fluid. According to the Lambert-Beer equation, the mol concentration CM of the fluid is determined by dividing a measured absorbance A by a molar absorption coefficient $\alpha$ and an optical path length L.

In addition, by correcting the reference absorption coefficient using a correction factor corresponding to the gas species, the concentration of another species of gas other than the reference gas can be obtained by using the corrected absorption coefficient. International Publication No. WO2020/158506 by one of the applicants of this application discloses a method of obtaining the concentration of an organometallic gas by correcting the absorption coefficient of the reference gas (here acetone gas) using the correction factor (MO factor) for performing concentration measurement of the organometallic gas.

However, the wavelength of the light emitted from the light source may differ slightly depending on the light emitting element (typically LED) being used. For example, even an LED designed to have a peak wavelength of 300 nm actually emits light having a peak wavelength from about 295 nm to about 305 nm. In addition, the emission spectrum of the LED may fluctuate over a long period of use. For this reason, an incident light having a wavelength deviating from an assumed wavelength may be used, and in this case, even if the concentration of the gas in the measurement cell is same, the absorbance may differ depending on the wavelength of the incident light.

On the other hand, International Publication No. WO2020/158506 described above discloses a method of obtaining the concentration by modifying the above error using the absorption coefficient and the correction factor corresponding to the wavelength of the measurement light (and the fluid temperature). By using the light absorption coefficient and correction factor adapted to the emission wavelength in this way, it is possible to suppress errors caused by machine errors in an optical system.

However, the present inventors have found that there is a case where the suppression of errors is not sufficient, even when using different absorption coefficient and correction factor for each incident light wavelength as described above, depending on the species of the reference gas and measurement gas.

The present invention has been made in view of the above problems, and its main object is to provide a concentration measurement method and a concentration measurement device capable of improving measurement accuracy when performing an actual concentration measurement of a gas by correcting an absorption coefficient of a reference gas.

Solution to Problem

The concentration measurement method according to an embodiment of the present invention is performed by a concentration measurement device comprising an electric unit having a light source and a photodetector; a fluid unit having a measurement cell through which a gas flows; and a processing circuit for calculating a concentration of the gas based on an output of the photodetector, after detecting an intensity of a light passing through the measurement cell after being incident on the measurement cell from the light source by the photodetector. The concentration measurement method includes a step of determining an absorption coefficient of the measurement gas by using a reference absorption coefficient associated with the reference gas, which is obtained by flowing a reference gas through the measurement cell using the photodetector, and a correction factor associated with the measurement gas; and a step of obtaining the concentration of the measurement gas flowing through the measurement cell by using the absorption coefficient of the measurement gas. When the absorption peak wavelength of the measurement light is longer with respect to the peak wavelength of the light source light emitted from the light source, a reference gas having a longer absorption peak wavelength with respect to the peak wavelength of the light source light is used; and when the absorption peak wavelength of the measurement gas is short with respect to the peak wavelength of the light source light, a reference gas having a shorter absorption peak wavelength with respect to the peak wavelength of the light source light is used.

In one embodiment, the light emitted from the light source is near-ultraviolet light, and the measurement gas and the reference gas are gases having absorption peak wavelengths greater than 300 nm.

In one embodiment, the reference gas is any one of the acetone gas, acetaldehyde gas, $SO_2$ gas, $Cl_2$ gas, and $NO_2$ gas.

In one embodiment, the concentration measurement device includes a band pass filter for passing the light from the light source and performs concentration measurement using a light having a narrowed half-width.

In one embodiment, the concentration measurement method includes a step of measuring the peak wavelength of the light source light when measuring the concentration of the measurement gas, and the concentration of the measurement gas is obtained by using a reference absorption coefficient determined on the basis of the measured peak wavelength of the light source light, with reference to a plurality of reference absorption coefficients associated with the peak wavelength of the light source light.

In one embodiment, the concentration measurement method includes a step of measuring a temperature of the gas when measuring the concentration of the measurement gas, and the concentration of the measurement gas is obtained by using a reference absorption coefficient determined on the basis of the measured gas temperature, with reference to a plurality of reference absorption coefficients associated with the gas temperature in the measurement cell.

The concentration measurement device according to an embodiment of the present invention includes an electric unit having a light source and a photodetector; a fluid unit having a measurement cell through which a gas flows, an intensity of a light passing through the measurement cell after entering from the light source being detected by the photodetector; and a processing circuit for calculating a concentration of the gas based on an output of the photodetector. A band pass filter is provided for passing through the light from the light source before being incident on the measurement cell. The processing circuit has a storage unit for storing a reference absorption coefficient associated with the reference gas and a correction factor associated with the reference gas; and is configured to calculate the concentration of the measurement gas based on the reference absorption coefficient, the correction factor, and the output of the photodetector, as the reference absorption coefficient, with respect to the peak wavelength of the light source light emitted from the light source, when the absorption peak wavelength of the measurement gas is long, the reference absorption coefficient obtained from the reference gas having a longer absorption peak wavelength with respect to the peak wavelength of the light source light is used, and when the absorption peak wavelength of the measurement gas is short with respect to the peak wavelength of the light source light, the reference absorption coefficient obtained from the reference gas having a shorter absorption peak wavelength with respect to the peak wavelength of the light source light is used.

Effect of Invention

According to the embodiment of the present invention, it is possible to appropriately perform concentration measurement of various species of gases by an optical method.

BRIEF DESCRIPTION OF DRAWINGS

FIG. 4(a) shows an absorption coefficient set for each LED peak wavelength and gas temperature inside the cell for the reference gas (here acetone), and 4(b) shows the corresponding correction factors (MO factors) applied to the measurement gas (here organometallic gas).

DESCRIPTION OF EMBODIMENTS

Embodiments of the present invention will be described below with reference to the drawings, but the present invention is not limited to the following embodiments.

Figure 1:
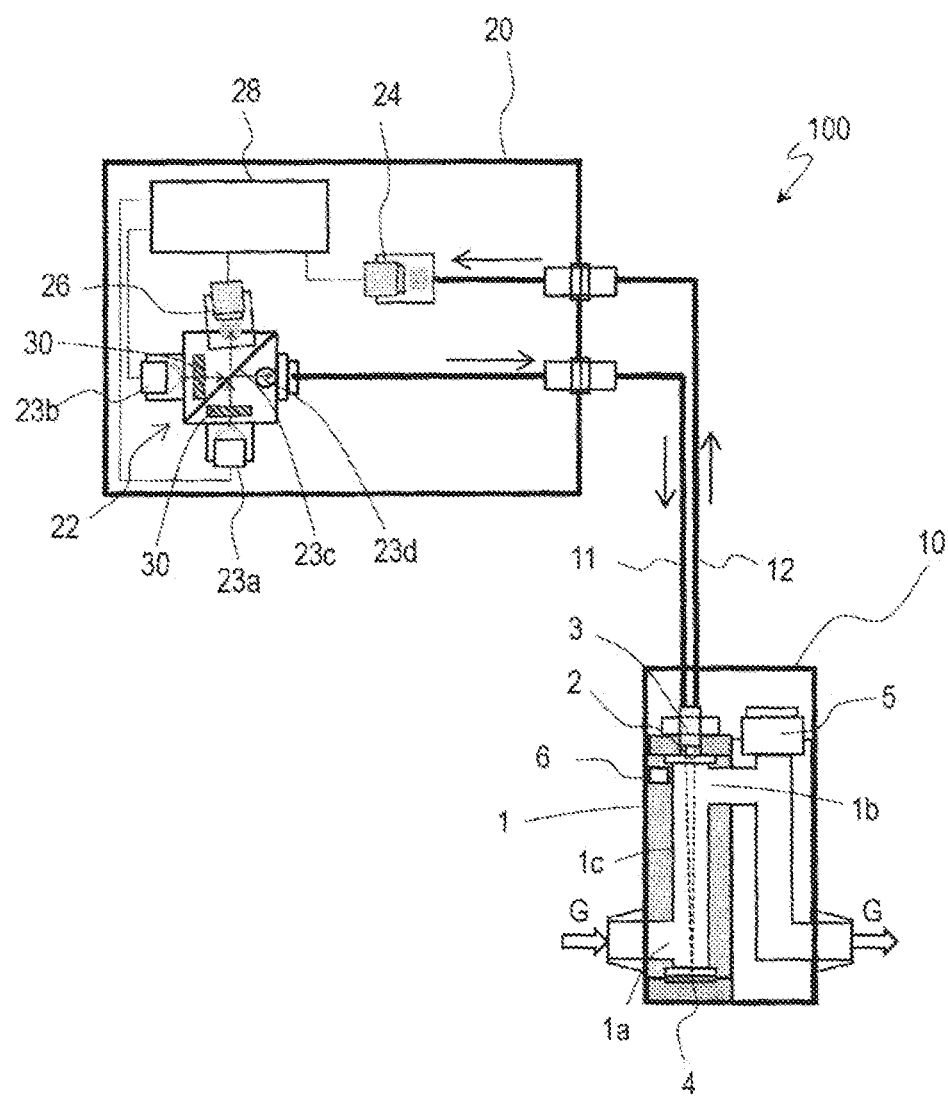
FIG. 1 is a schematic diagram showing an overall configuration of the concentration measurement device used for the concentration measurement method according to the embodiments of the present invention.

FIG. 1 is the diagram illustrating the overall configuration of the concentration measurement device 100 used in the embodiments of the present invention. The concentration measurement device 100 includes a fluid unit 10 having a measurement cell 1 incorporated in a gas supply line, and an electric unit 20 arranged apart from the fluid unit 10. The fluid unit 10 and the electric unit 20 are optically and electrically connected by an optical fiber cable 11 for incident, an optical fiber cable 12 for emission, and a sensor cable (not shown).

The fluid unit 10 is not particularly limited in temperature of use, for example, it is possible to be used in a room temperature environment and may be heated to about 100° C. to 150° C. depending on the species of measurement gas. On the other hand, the electric unit 20 connected to the fluid unit 10 is usually provided in a room temperature environment because its high temperature resistance is low. Therefore, when the temperature at the time of measurement is about room temperature, it may be integrated with the fluid unit 10 or provided separately, but when its temperature is likely to be higher than the heat resistant temperature of the electric unit 20, it should be provided separately. The electric unit 20 is typically connected to an external control device for transmitting an operation control signal to the concentration measurement device 100 or for receiving a measurement concentration signal from the concentration measurement device 100.

The fluid unit 10 is provided with a measurement cell 1 having an inlet 1a and an outlet 1b of the measurement gas, and a flow path 1c extending in the longitudinal direction connected thereto. A transmittance light window portion 2 (here, a sapphire plate) in contact with the flow path is provided at one end of the measurement cell 1, and a reflecting member 4 is provided at the other end of the measurement cell 1. In the present specification, light includes not only visible light but also at least infrared light and ultraviolet light, also it may include electromagnetic waves of any wavelength. In addition, transmission means that the internal transmittance with respect to the light incident on the measurement cell is high enough to allow concentration measurement.

The wavelength of the measurement light may be appropriately selected on the basis of the absorption characteristic of the gas to be measured. In this embodiment, a near-ultraviolet light (e.g., a wavelength of 200 nm to 400 nm) suitable for concentration measurement of a gas such as an organometallic gas (e.g., trimethylgallium (TMGa)) that absorbs ultraviolet light is used.

In addition to the organometallic gas, gases that absorb near-ultraviolet light include acetone gas, chlorine gas, fluorine gas, bromine gas, titanium chloride gas, nitrogen dioxide gas, sulfur dioxide gas, and acetaldehyde gas. In the present embodiment, a gas capable of absorbing near-ultraviolet light as described above is used as a reference gas, and a concentration of a measurement gas capable of absorbing near-ultraviolet light is detected. However, as will be described later, a gas that is not only capable of simply absorbing near-ultraviolet light but also has an absorption characteristic compatible with the measurement gas is selected as the reference gas.

In the vicinity of the window portion 2 of the measurement cell 1, a collimator 3 connected to the optical fiber cables 11 and 12 is attached. The collimator 3 has a convex lens as a collimating lens, and it is configured to make the light from the light source incident on the measurement cell 1 as a parallel light through the window portion 2, and to receive the reflected light from the reflecting member 4. The reflecting surface of the reflecting member 4 is provided perpendicular to the traveling direction of the incident light or the central axis of the flow path. The flow path 1c of the measurement cell 1 is also used as an optical path of the measurement light.

As the window portion 2, a sapphire plate is suitably used because it has resistance to the detection light such as a near-ultraviolet light used for concentration measurement, and has high transmittance, also it is mechanically and chemically stable. However, other materials such as quartz glass, calcium fluoride, and magnesium fluoride can also be used. The main body (flow path forming portion) of the measurement cell 1 is made of, for example, SUS316L.

In addition, the reflecting member 4 may have a configuration, for example, in which an aluminum layer or a dielectric multilayer film is provided on the back surface of the sapphire plate as the reflective layer. If a dielectric multilayer film is used as the reflective layer, a light of a specific wavelength range can be selectively reflected. The dielectric multilayer film is composed of a laminate of a plurality of optical thin films having different refractive indices (the high refractive index film and the low refractive index film are alternately laminated), and by appropriately selecting the thickness and the refractive index of each layer, it is possible to reflect or transmit light of a specific wavelength. Moreover, by design, the dielectric multilayer film is possible to reflect light at an arbitrary ratio. A portion of the light (e.g., 10%) may be transmitted and detected by a photodetector installed in the lower portion of the reflecting member 4 as the reference light.

The fluid unit 10 also includes a pressure sensor 5 for detecting the pressure of the measurement gas flowing through the measurement cell 1, and a temperature sensor 6 for measuring the temperature of the measurement gas. Outputs of the pressure sensor 5 and the temperature sensor 6 are sent to the electric unit 20 via a sensor cable (not shown). Outputs of the pressure sensor 5 and the temperature sensor 6 are used to measure the gas concentration.

In the concentration measurement device 100 of the present embodiment, the electric unit 20 includes a light source 22 for generating light to be incident on the measurement cell 1, a photodetector 24 for receiving light emitted from the measurement cell 1, and a processing circuit 28 for calculating the concentration of the measurement gas based on a detection signal output from the photodetector 24 (detection signal corresponding to the intensity of the received light).

The processing circuit 28 is configured of, for example, a processor and a memory provided on a circuit board, and includes a computer program for executing a predetermined arithmetic operation based on an input signal. The processing circuit 28 can be realized by a combination of hardware and software. Although the processing circuit 28 in the illustrated embodiment is incorporated in the electric unit 20, it is needless to say that a part (CPU, etc.) or all of the components may be provided in a device outside the electric unit 20.

In addition, the light source 22 is configured by two light emitting elements 23a and 23b (here LEDs) emitting ultraviolet light of wavelengths different from each other. In the light emitting elements 23a and 23b, by flowing driving currents of different frequencies using an oscillation circuit, and performing frequency analysis (e.g., fast Fourier transform, or wavelet transform), it is possible to measure the intensity of the light corresponding to each wavelength component from the detection signal detected by the photodetector 24. As the light emitting elements 23a and 23b, LDs (laser diodes) may also be used. In addition, instead of using a multiplexed light of a plurality of different wavelengths as the light source, it is also possible to use a light source of a single wavelength, in this case, the multiplexer and the frequency analysis circuit can be omitted.

The light emitting elements 23a and 23b are arranged so as to irradiate light at an angle of 45° each with respect to the half mirror 23c. In addition, a reference photodetector 26 is provided so as to face the one light emitting element 23b across the half mirror 23c. A part of the light emitted from the light source 22 is incident on the reference photodetector 26 and is used to investigate degradation or the like of the optical element. The remaining light, after being condensed by the ball lens 23d, is incident to the optical fiber cable 11 for incident light. As the light receiving element for the photodetector 24 and the reference photodetector 26, for example, a photodiode or a phototransistor may be used.

An aspect of transmitting the incident light and the reflected light by separate optical fiber cables has been described above, however, as well as transmitting the incident light and the reflected light by a single optical fiber cable, a spectral element may be provided to separate reflected light in the electric unit 20 and to guide it to the photodetector 24. In addition, without using the reflecting member 4 as described above, a transmission type measurement cell configured to take out the light passing through the cell via the window portion for emission from the side of the reflecting member may be used.

In the concentration measurement device 100 configured as described above, the concentration of the gas in the cell is measured by detecting the intensity of the light emitted from the light source 22 and passed through the measurement cell 1 by the photodetector 24. However, even if the light emitting elements 23a and 23b constituting the light source 22 are of the same design, the peak wavelength and the half-value width thereof have individual differences.

Figure 2:
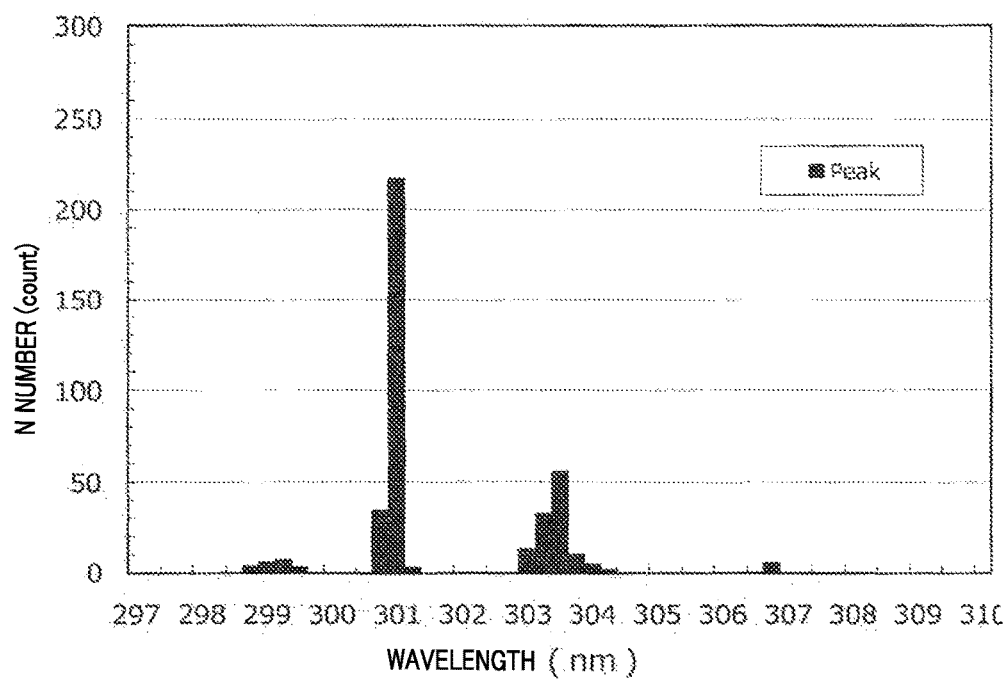
FIG. 2 is a graph showing variations of an actual peak wavelength and a half width (FWHM) of the plurality of LEDs of the same design.
Figure 2:
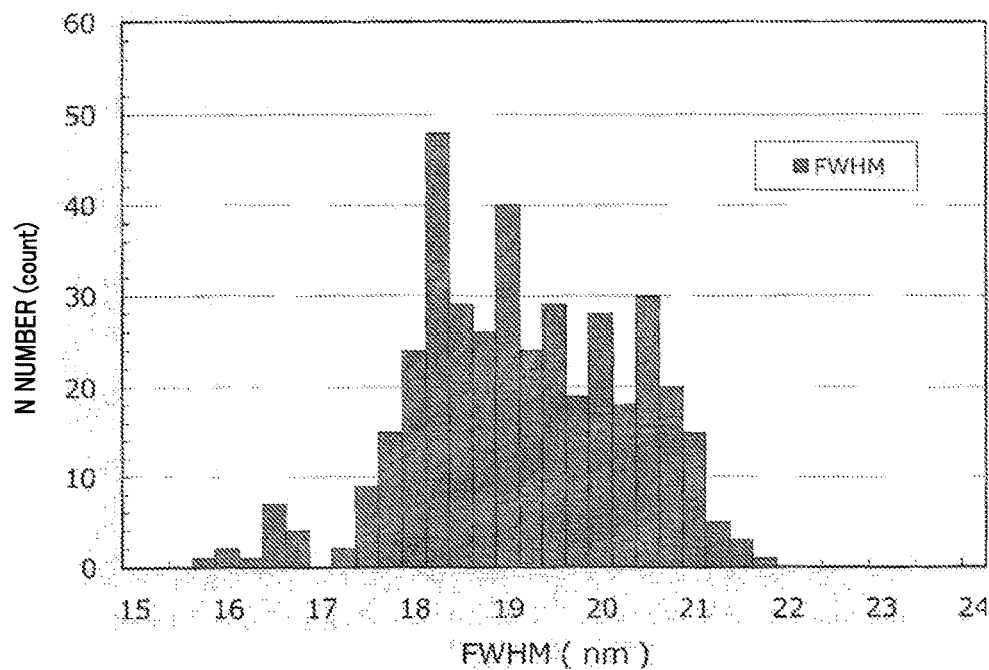

FIGS. 2(a) and 2(b) are graphs showing the distribution of the peak wavelength and half-width for LED 400 pieces (peak wavelength 300±5 nm). Thus, the peak wavelength and half-width varies depending on the actually used LED. This may cause increasing errors in the concentration measurement.

Therefore, in the electric unit 20 of the present embodiment, the light source 22 is provided with a bandpass filter (hereinafter, sometimes referred to as BPF) 30. As shown in FIG. 1, BPF30 is disposed in front of each of the light emitting elements 23a and 23b respectively. In the present embodiment, BPF30 is fixed using a BPF-fixing coupler, and BPF30 can be replaced as needed. As BPF 30, for example, one manufactured by Sigma Optical Co., Ltd., can be used.

The bandpass filter 30 acts to attenuate components of wavelengths apart from the peak wavelengths of the light emitting elements 23a and 23b. The spectrum of the light passing through the bandpass filter 30 becomes steeper, and the half-width value (e.g., FWHM (Full Width at Half Maximum) of the light becomes smaller.

Figure 3:
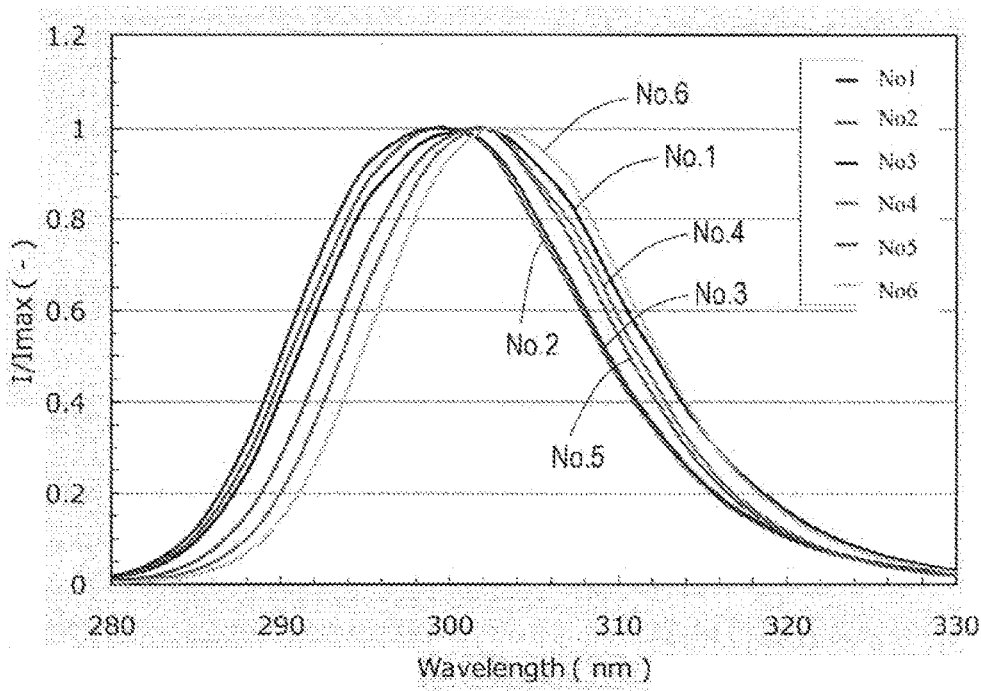
FIG. 3(a) shows a spectrum when there is no band pass filter in front of the LEDs, and 3(b) shows a spectrum when a band pass filter is provided.
Figure 3:
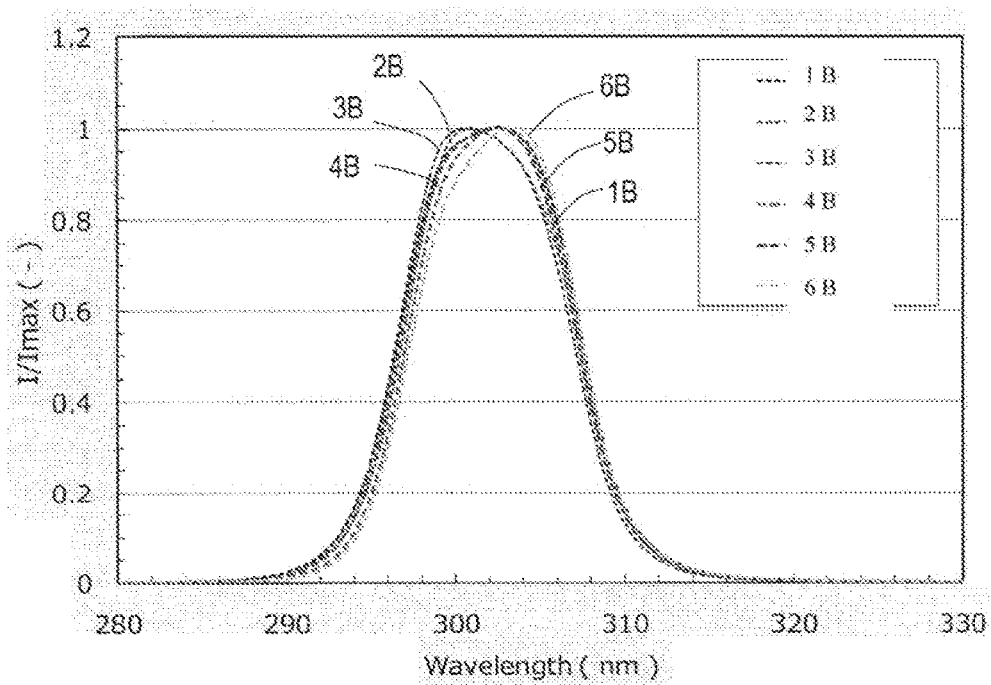

FIGS. 3(a) and 3(b) are diagrams showing spectra of the LEDs (No. 1 to No. 6) before and after passing through the bandpass filter. FIG. 3(a) shows the normalized spectrum of each LED (No. 1 to No. 6) not passing through the bandpass filter, and FIG. 3(b) shows the spectrum of each LED (1B~6B) after passing through the bandpass filter.

As can be seen from FIGS. 3(a) and 3(b), the FWHM of the light after passing through the bandpass filter is smaller in any one of the LEDs, while the variation of the peak wavelengths of the light does not change much. In this way, since it is possible to select incident light in the desired wavelength range, the wavelength dependence of the absorption coefficient can be reduced. In this embodiment, after passing through the BPF, the FWHM is preferably 15 nm or less, more preferably 12 nm or less.

Hereinafter, a procedure of concentration measurement performed by using the concentration measurement device of the present embodiment will be described. In the reflection type measurement cell 1 shown in FIG. 1, the optical path length of the light reciprocating one round in the measurement cell 1 can be defined by twice the distance between the window portion 2 and the reflecting member 4. In the concentration measurement device 100, the light having wavelength λ reflected by the reflecting member 4 is absorbed depending on the concentration of the gas after being incident on the measurement cell 1. Then, the processing circuit 28 can measure the absorbance Aλ at the wavelength λ by frequency analyzing the detected signal from the photodetector 24, and further calculate the molar concentration CM from the absorbance Aλ based on the Lambert-Beer law shown in the following equation (1):

$$A\lambda = -\ln(I/I_0) = \alpha L C_M \quad (1)$$

In the equation (1), $I_0$ is the intensity of the incident light incident on the measurement cell, I is the intensity of the light passing through the gas in the measurement cell, α is the molar absorption coefficient (m²/mol), L is the optical path length (m), and CM is the molar concentration (mol/m³). The molar absorption coefficient α is α coefficient determined by the substance, where the absorption coefficient α relative to the natural logarithm is used. $I/I_0$ is commonly referred to as transmittance. When the transmittance $I/I_0$ is 100%, the absorptance Aλ becomes 0, and when the transmittance $I/I_0$ is 0%, the absorptance Aλ becomes infinity. Incidentally, with respect to the intensity $I_0$ of the incident light in the equation (1), the intensity of the light detected by the photodetector 24 may be regarded as the incident light intensity $I_0$ when there is no light absorbing gas in the measurement cell 1 (for example, when a gas that does not absorb ultraviolet light is filled or when it is pulled into a vacuum).

The concentration measurement device 100 may be configured to determine the concentration of the gas in consideration of the pressure and temperature of the gas flowing through the measurement cell 1. Specific examples will be described below. The above Lambertian-Beer's equation (1) is established, but the above molar concentration $C_M$ is the mass of the gases per unit volume and can be expressed as $C_M$=n/V. Here, n is the mass (mol) of the gas, i.e., the number of moles, and V is the volume (m³) of the gas. Then, since the measurement object is a gas, the molar concentration $C_M$=n/V=P/RT is derived from PV=nRT, or the equation of state of the ideal gas, and this is substituted into the equation of Lambert Beer, and by applying $-\ln(I/I_0)=\ln(I_0/I)$, the following equation (2) can be obtained:

$$\ln(I_0/I) = \alpha L(P/RT) \quad (2)$$

In the equation (2), R is the gas constant=0.0623 (Torr·m³/K/mol), P is the pressure (Torr) and T is the temperature (K). The molar absorption coefficient α in the equation (2) is an absorption coefficient α corresponding to the natural logarithm of the transmittance.

Here, the pressure that can be detected by the pressure sensor is the total pressure Pt (Torr) of the mixed gas containing the measurement gas and the carrier gas. On the other hand, the gas related to the absorption is only the measurement gas, and the pressure P in the above equation (2) corresponds to the partial pressure Pa of the measurement gas. Therefore, if the partial pressure Pa of the measurement gas is expressed by the equation (2) using Pa=Pt·Cv, which is an equation expressed by the concentration Cv (volume %) of the measurement gas and the total pressure Pt in the entire gas, the relation between the concentration (volume %) of the measurement gas and the absorbance considering the pressure and the temperature can be expressed by the equation (3) below using the absorption coefficient $\alpha_a$ of the measurement gas:

$$\ln(I_0/I) = \alpha_a L(Pt \cdot Cv/RT) \quad (3)$$

In addition, when the equation (3) is transformed, the following equation (4) is obtained:

$$Cv = (RT/\alpha_a L Pt) \cdot \ln(I_0/I) \quad (4)$$

Therefore, according to the equation (4), it is possible to calculate the measurement gas concentration (volume %) at the wavelength of the measurement light based on the measured values (the gas temperature T, the total pressure Pt, and the transmitted light intensity I). In this manner, the concentration of the absorption coefficient gas in the mixed gas can be obtained in consideration of the gas temperature and the gas pressure. The absorption coefficient $\alpha_a$ of the measurement gas can be obtained in advance from the measurement values (T, Pt, I) when the measurement gas having a known concentration (for example, 100% concentration) is flowed, according to the equation (3) or (4). The absorption coefficient $\alpha_a$ obtained in this manner is stored in a memory, and the absorption coefficient $\alpha_a$ can be read out from the memory and used when the concentration of a measurement gas of unknown concentration is calculated based on the equation (4).

Here, the absorption coefficient will be described. The absorption coefficient differs for each species of gas, but the absorption coefficient for the gas to be measured can also be obtained by using the absorption coefficient of the reference gas (hereinafter, sometimes referred to as the reference absorption coefficient) and the correction factor. Such correction factor is disclosed in International Publication No. WO2020/158506 by one of the applicants of the present application. The correction factor is defined as, for example, a value obtained by dividing the absorption coefficient of the reference gas by the absorption coefficient of the measurement gas. The correction factor may also be defined as the absorption coefficient of the measurement gas divided by the absorption coefficient of the reference gas.

For example, when the reference gas is an acetone gas and the measurement target is a predetermined gas (here, $NO_2$), the following relational expression is established when the absorption coefficient of the acetone gas is $\alpha_{ace}$, the concentration of the acetone gas is $C_{ace}$, the absorption coefficient of the measurement target gas is $\alpha_{NO2}$, the concentration of the measurement target gas is $C_{NO2}$, and the correction factor ($\alpha_{ace}/\alpha_{NO2}$) for the measurement gas is MF.

$$C_{NO2}=(\alpha_{ace}/\alpha_{NO2})\cdot C_{ace}=MF\cdot C_{ace} \quad (5)$$

Here, $C_{ace}$ is given by $C_{ace}=(RT/\alpha_{ace}LPt\cdot\ln(I_0/I)$ from the above equation (4).

Therefore, when the absorption coefficient $\alpha_{ace}$ of the reference gas is obtained by using the concentration measurement device and stored in the memory prior to shipping or the like, when performing concentration measurement of the measurement gas, the concentration can be obtained from the equation (4) by using the absorption coefficient $\alpha_{NO2}$ obtained by dividing the absorption coefficient $\alpha_{ace}$ of the reference gas by the correction factor MF. Alternatively, as can be seen from the equation (5), the concentration of the measurement gas can be determined by multiplying the concentration determined assuming acetone by the correction factor MF.

The above mentioned correction factor MF can be obtained by calculating the absorption coefficient $\alpha_{NO2}$ from the measured value (T, Pt, I) of the concentration measurement device when flowing a measurement gas having a known concentration, and dividing the absorption coefficient $\alpha_{ace}$ of the reference gas by the absorption coefficient $\alpha_{NO2}$ calculated from the measured values.

If the correction factor is obtained in this manner, the reference absorption coefficient for each concentration measurement device can be obtained using the reference gas before shipment, and the concentration of the measurement target gas can be measured after shipment by correcting the absorption coefficient by using the correction factor. Errors in the concentration measurement caused by the design of the respective optical systems of the concentration measurement device are calibrated in advance in the process of obtaining the absorption coefficient by using the reference gas. Therefore, when measuring the concentration of the measurement gas after shipment, it is possible to suppress the occurrence of a machine difference for each concentration measurement device.

In addition, International Publication No. WO2020/158506 discloses obtaining a plurality of absorption coefficients of a reference gas in association with the incident light wavelength and the gas temperature, and storing each absorption coefficient in a table, for example. In addition, it discloses obtaining a plurality of correction factors in the same manner, in association with the incident light wavelength and the gas temperature, when performing the concentration measurement of the measurement gas, the absorption coefficient for the measurement gas can be determined by using the appropriate reference absorption coefficient and correction factor based on the incident light wavelength and the gas temperature at that time. FIG. 4(a) shows a table of absorption coefficients for acetone set in association with LED peak wavelength and cell temperature, and FIG. 4(b) shows a table of corresponding correction factors (MO factors).

However, according to experiments by the inventors of the present application, it has been confirmed that errors in the concentration measurement of the measurement gas may be increased depending on the species of the reference gas and the species of the measurement gas when there is a variation range in the wavelength of the measurement light as described above.

Figure 5:
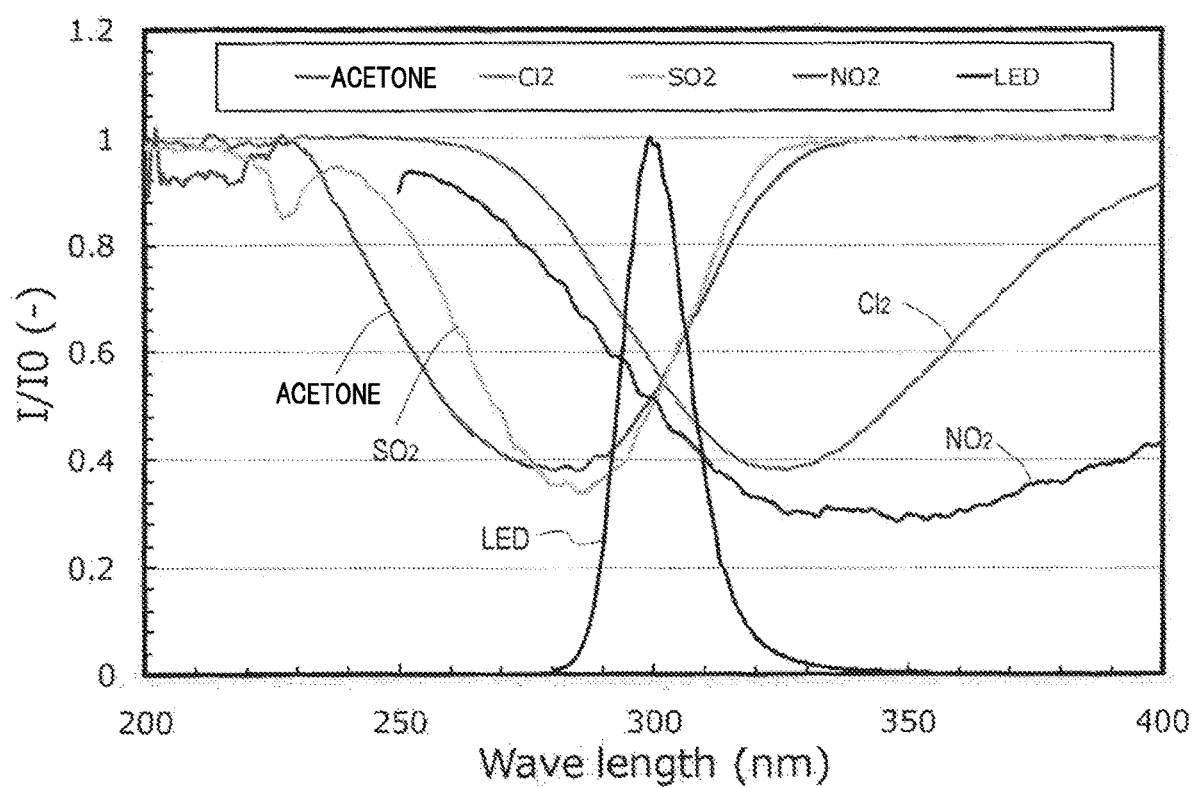
FIG. 5 is a graph showing absorption characteristics and LED spectrums of various gases.

FIG. 5 is a graph showing the spectrum of the light source LED and the absorption curve of each gas. The absorption peaks of the gases are about 280.25 nm for acetone, about 325.5 nm for chlorine ($Cl_2$), about 286.25 nm for sulfur dioxide ($SO_2$), and about 350 nm for nitrogen dioxide ($NO_2$).

While the peak wavelength of the light source LED is about 300 nm, the absorption peak wavelength of acetone is present in the vicinity of 280 nm, which is smaller than 300 nm, and the absorption peak wavelength of chlorine gas is present in the vicinity of 326 nm, which is larger than 300 nm. The absorption peak wavelength of $NO_2$, which is the target of the concentration measurement here, is present in the vicinity of 350 nm, which is larger than 300 nm. In addition, in the organometallic gas used in semiconductor manufacturing, there is also one having an absorption peak wavelength of 300 nm or more (e.g., about 320 nm).

In such a case, when the peak wavelength of the light source is at a longer wavelength side than 300 nm and for example, light having a peak wavelength of 302.5 nm is emitted, absorption becomes smaller in the acetone gas, whereas absorption becomes larger in the chlorine gas and the measurement gas. In addition, when the peak wavelength of the light source is at a shorter wavelength side than 300 nm and for example, light having a peak wavelength of 297.5 nm is emitted, the absorption becomes larger in the acetone gas, whereas the absorption becomes smaller in the chlorine gas and the measurement gas.

For this reason, in the case where acetone gas or sulfur dioxide gas, etc., is used as the reference gas, even though the absorption peak wavelength of the measurement gas is larger than 300 nm, the appropriate correction factor greatly differs depending on each wavelength, which may increase errors in the concentration measurement. On the other hand, when chlorine gas or nitrogen dioxide gas is used as the reference gas, the appropriate correction factor itself does not differ greatly by each wavelength. Therefore, for example, if obtaining the absorption coefficient for each wavelength in the calibration stage using a reference gas, as the correction factor, it is also possible to use the same regardless of the wavelength. As a result, the errors in the concentration measurement can be reduced without measuring the correction factor for each wavelength using a measurement gas. Also when setting the correction factor for each wavelength, since these are less likely to be significantly different values, it is possible to reduce the errors as a result.

From the above, it is considered that when the concentration measurement is performed using the correction factor, it is effective to use a gas having the same light absorption characteristics as the measurement gas as the reference gas in order to reduce errors. More specifically, with respect to the peak wavelength of the light source light emitted from the light source, when the absorption peak wavelength of the measurement gas is long, it is considered to be preferable to use a reference gas having a longer absorption peak wavelength with respect to the peak wavelength of the light source light, and when the absorption peak wavelength of the measurement gas is short with respect to the peak wavelength of the light source light, it is considered to be preferable to use a reference gas having a shorter absorption peak wavelength with respect to the peak wavelength of the light source light.

In addition, FIGS. 6(a), 6(b) and FIGS. 7(a), 7(b) are graphs showing the wavelength dependence of the absorption coefficient when it is passing through the bandpass filter (black circles), and when it is not passing (white square). The plurality of light sources (LEDs) being used have peak wavelengths of 299.5 nm to 303.5 nm. In addition, FWHM without the bandpass filter was 17.5 nm to 21.25 nm, and FWHM with the bandpass filter was 10.5 nm to 11.25 nm.

Figure 6:
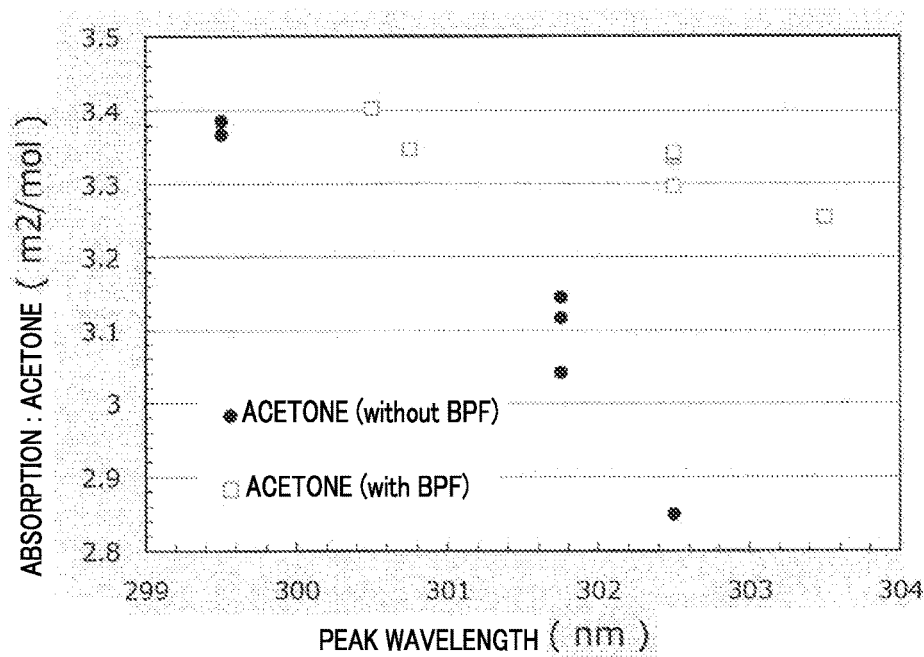
FIG. 6 shows graphs showing the wavelength dependence of the absorption coefficients in the absence and presence of a bandpass filter, where 6(a) is a graph for acetone and 6(b) is a graph for sulfur dioxide ($SO_2$).
Figure 6:
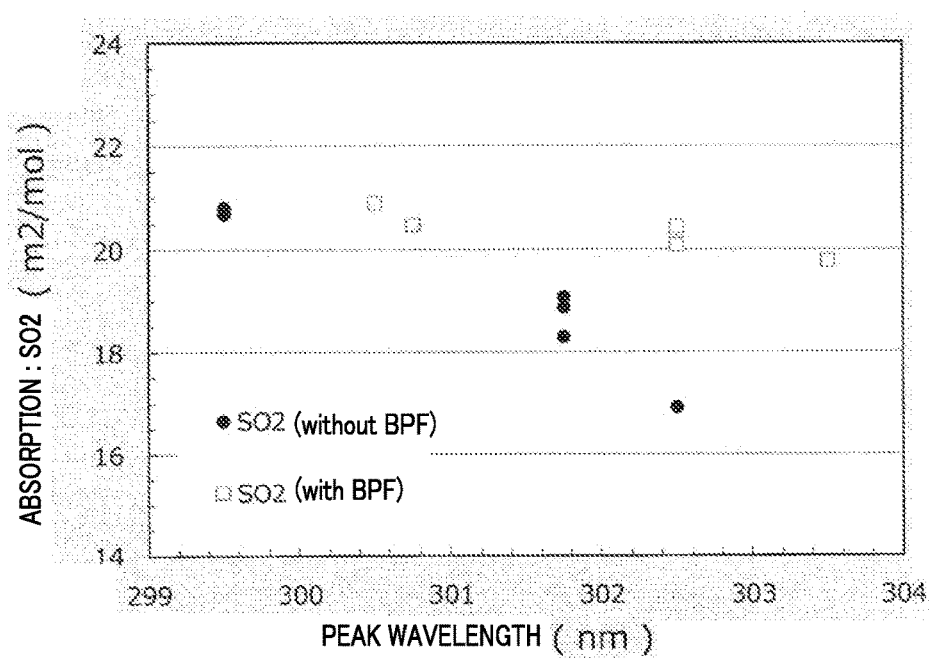

FIGS. 6(a) and 6(b) show the relation between the light source peak wavelength and the absorption coefficient when flowing acetone and $SO_2$ under the conditions of 100 Torr and 125° C. Acetones and $SO_2$ are gases having absorption peak wavelengths less than 300 nm. Therefore, as the wavelength of the LED increases from 300 nm, the value of the absorption coefficient generally decreases.

Figure 7:
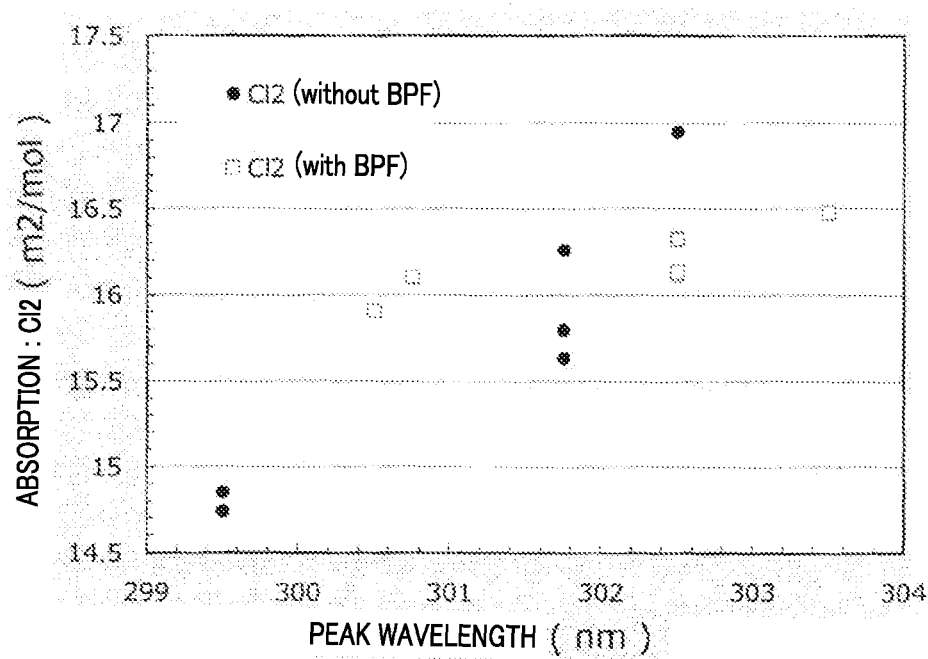
FIG. 7 shows graphs showing the wavelength dependence of the absorption coefficients in the absence and presence of a bandpass filter, where 7(a) is a graph for chlorine ($Cl_2$) and 7(b) is a graph for nitrogen dioxide ($NO_2$).
Figure 7:
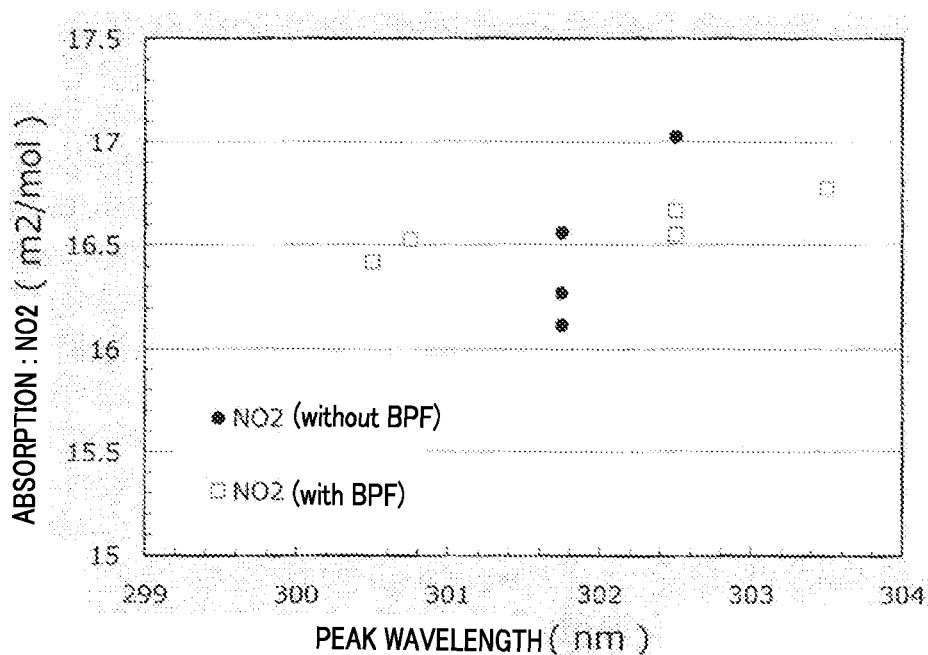

FIGS. 7(a) and (b) show the relation between the light source peak wavelength and the absorption coefficient when flowing $Cl_2$ and $NO_2$ under the conditions of 100 Torr and 125° C. of $Cl_2$ and $NO_2$ are gases having absorptive peak wavelengths greater than 300 nm. Therefore, as the wavelength of the LED increases from 300 nm, the value of the absorption coefficient generally increases.

As can be seen from FIGS. 6(a), 6(b) and 7(a), 7(b), when passing through the bandpass filter (open square), the variation of the absorption coefficients with respect to the light source peak wavelengths is suppressed in any of the acetone gas, $SO_2$, $Cl_2$, and $NO_2$ as compared with that before passing through the filter. Therefore, it is understood that the use of the bandpass filter can suppress the occurrence of the variation in the absorption coefficient depending on the wavelength.

From the above, it was found that together with obtaining the reference absorption coefficient using the gas having the absorption characteristic corresponding to the measurement gas as the reference gas, by using a light source light whose band is narrowed by the bandpass filter, the variation of the correction factor can be further effectively suppressed. This makes it possible to measure the concentration of the measurement gas with further improved accuracy.

While the concentration measurement device according to the embodiments of the present invention has been described above, the present invention is not limited to the above embodiment, and various changes can be made without departing from the spirit of the present invention. For example, as the light used for measurement, depending on the species of the gas, a light in a wavelength region other than the ultraviolet region, (e.g., visible light) may be used. In addition, as the reference absorption coefficient, a plurality of reference absorption coefficients associated with the wavelength and temperature may be used.

The plurality of reference absorption coefficients is set in association with at least any one of the light source peak wavelengths and gas temperatures as described in International Publication No. WO2020/158506, for example. In the case of associating with the light source peak wavelength, a step of measuring the light source peak wavelength is performed when measuring the concentration of the measurement gas. Then, the reference absorption coefficient to be used is determined on the basis of the measured light source peak wavelength.

Thus, by using a reference absorption coefficient (or correction factor) that accommodates the wavelength of the light source light, the concentration of the measurement gas can be more accurately obtained. Similarly, in the case of associating with the gas temperature, when measuring the concentration of the measured gas, the gas temperature is measured, and based on the measured gas temperature, a reference absorption coefficient (or correction factor) to be used is determined. Of course, a matrix-like reference absorption coefficient associated with both the light source peak wavelength and the gas temperature (see, FIG. 4(a)) and the corresponding correction factor (see, FIG. 4(b)) may be set in advance. In this case, the reference absorption coefficient and the correction factor to be used can be determined based on both the light source peak wavelength and the gas temperature measured at the time of concentration measurement, and the concentration of the measurement gas can be determined based on the reference absorption coefficient and the correction factor. Note that the reference absorption coefficient may be determined in advance, or may be determined at the time of concentration measurement.

Furthermore, in the above description, an embodiment has been described in which an absorption coefficient of a reference gas (e.g., $Cl_2$) having similar absorption characteristics is used for measuring the concentration of a measurement gas (e.g., $NO_2$) having an absorption peak wavelength greater than 300 nm, but the present invention is not limited to this. An embodiment in which an absorption coefficient of a reference gas (e.g., acetone gas) having similar characteristics is used for measuring the concentration of a measurement gas (e.g., $SO_2$) having an absorption peak wavelength smaller than 300 nm is also included in the embodiments of the present invention.

In addition, the reference gas and the measurement gas exemplified above may be used vice versa, that is, the reference gas described above may be used as the measurement gas, and the measurement gas described above may be used as the reference gas. Moreover, the reference light source wavelength is not limited to 300 nm, and it is needless to say that any wavelength may be used. The concentration measurement accuracy can be improved by using a light source having a wavelength that accommodates the absorption characteristic of the measurement gas and using a reference gas having an absorption peak wavelength similar to that of the measurement gas with respect to the peak wavelength of the light source.

INDUSTRIAL APPLICABILITY

The concentration measurement method according to the embodiments of the present invention is suitably utilized for concentration measurement of various gases in semiconductor manufacturing equipment or the like.

REFERENCE SIGNS LIST

1 Measurement cell
2 Window portion
3 Collimator
4 Reflective member
5 Pressure sensor
6 Temperature sensor
10 Fluid unit
11 Optical fiber cable (for incident light)
12 Optical fiber cable (for emitted light)
20 Electric unit
22 Light source
23a, 23b Light emitting element
30 Bandpass filter
24 Photodetector
26 Reference photodetector
28 Processing circuit
100 Concentration measurement device

The invention claimed is:

1. A concentration measurement method performed in a concentration measurement device comprising: an electric unit having a light source and a photodetector; a fluid unit having a measurement cell through which a gas flows; and a processing circuit configured to calculate a concentration of the gas based on an output of the photodetector, the photodetector detecting an intensity of a light passing through the measurement cell, the concentration measurement method comprising:
a step of determining an absorption coefficient of a measurement gas by using a reference absorption coefficient associated with a reference gas and a correction factor associated with the measurement gas; and
a step of determining a concentration of the measurement gas flowing in the measurement cell by using the absorption coefficient of the measurement gas,
wherein a reference gas having a longer absorption peak wavelength with respect to a peak wavelength of a light from the light source is used when an absorption peak wavelength of the measurement gas is longer with respect to the peak wavelength of the light from the light source, and
a reference gas having a shorter absorption peak wavelength with respect to the peak wavelength of the light from the light source is used when an absorption peak wavelength of the measurement gas is shorter with respect to the peak wavelength of the light from the light source.

2. The concentration measurement method according to claim 1, wherein the light from the light source is a near-ultraviolet light, and both of the measurement gas and the reference gas have an absorption peak wavelength longer than 300 nm.

3. The concentration measurement method according to claim 1, wherein the reference gas is selected from the group consisting of acetone gas, acetaldehyde gas, $SO_2$ gas, $Cl_2$ gas, and $NO_2$ gas.

4. The concentration measurement method according to claim 1, wherein the concentration measurement device has a bandpass filter for passing the light from the light source through and the concentration measurement is performed using a light having a narrowed half-width.

5. The concentration measurement method according to claim 1, further comprising a step of measuring the peak wavelength of the light from the light source,
wherein the concentration of the measurement gas is determined using a reference absorption coefficient determined on the basis of the measured peak wavelength of the light from the light source.

6. The concentration measurement method according to claim 1, further comprising a step of measuring a gas temperature,
wherein the concentration of the measurement gas is determined using a reference absorption coefficient determined on the basis of the measured gas temperature.

7. A concentration measurement device comprising:
an electric unit having a light source and a photodetector;
a fluid unit having a measurement cell through which a gas flows;
a processing circuit for calculating a concentration of the gas based on an output of the photodetector; wherein an intensity of light passing through the measurement cell after entering the measurement cell from the light source is detected by the photodetector; and
a bandpass filter through which light from the light source passes before being incident on the measurement cell,
wherein the processing circuit includes a storage unit for storing a reference absorption coefficient associated with a reference gas and a correction factor associated with a measurement gas; and the processing circuit is configured to calculate the concentration of the measurement gas based on the reference absorption coefficient, the correction factor, and the output of the photodetector, and
wherein as the reference absorption coefficient, a reference absorption coefficient associated with a reference gas having a larger absorption peak wavelength with respect to a peak wavelength of the light from the light source is used when an absorption peak wavelength of the measurement gas is larger with respect to the peak wavelength of the light from the light source, and
a reference absorption coefficient associated with a reference gas having a smaller absorption peak wavelength with respect to the peak wavelength of the light from the light source is used when an absorption peak wavelength of the measurement gas is smaller with respect to the peak wavelength of the light from the light source.

* * * * *